No. 857,052. PATENTED JUNE 18, 1907.
J. A. GRASBERGER.
FIFTH WHEEL.
APPLICATION FILED MAY 9, 1906.
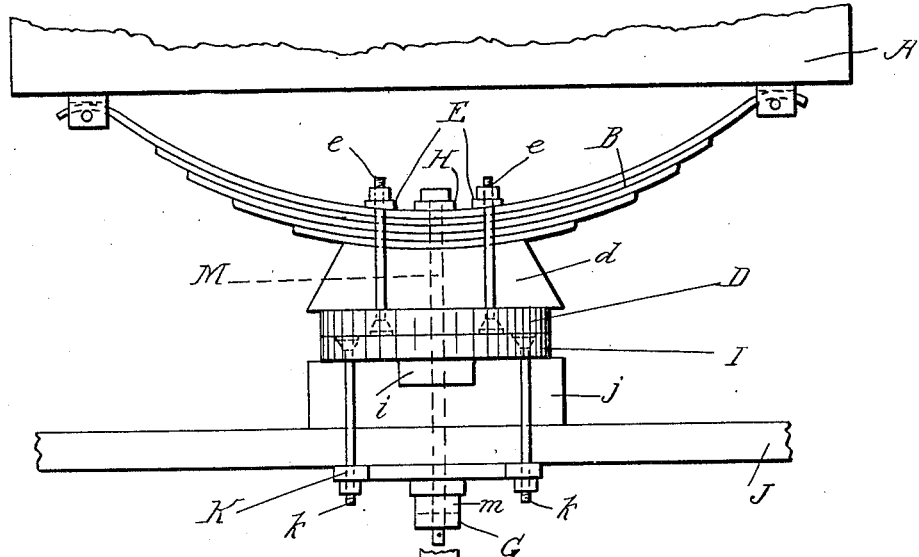
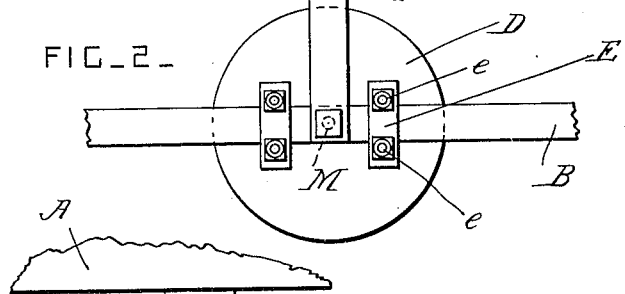
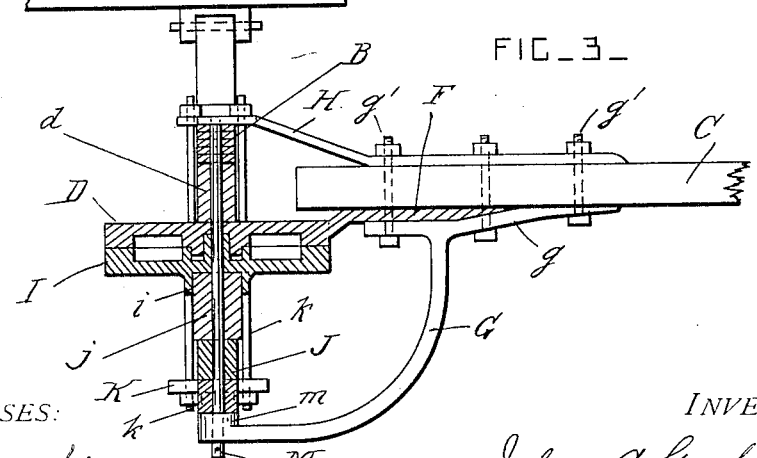
WITNESSES:
Walter Allen
L. B. Middleton
INVENTOR
Julius A. Grasberger.
BY Herbert W. T. Jenner.
Attorney
THE NORRIS PETERS CO., WASHINGTON, D. C.

UNITED STATES PATENT OFFICE.

JULIUS A. GRASBERGER, OF RICHMOND, VIRGINIA.

FIFTH-WHEEL.

No. 857,052.    Specification of Letters Patent.    Patented June 18, 1907.

Application filed May 9, 1906. Serial No. 315,987.

*To all whom it may concern:*

Be it known that I, JULIUS A. GRASBERGER, a citizen of the United States, residing at the city of Richmond, in the State of Virginia, have invented certain new and useful Improvements in Fifth-Wheels; and I do hereby declare the following to be a full, clear, and exact description of the invention, such as will enable others skilled in the art to which it appertains to make and use the same.

This invention relates to fifth wheels for wagons and other similar vehicles; and it consists in the novel construction and combination of the parts hereinafter fully described and claimed.

In the drawings, Figure 1 is a front view of the fifth wheel. Fig. 2 is a plan vew of the fifth wheel. Fig. 3 is a longitudinal section through the fifth wheel.

A is a portion of a wagon body, and B is a leaf spring having its end portions secured to the underside of the part A in any approved manner.

C is the end portion of a reach of any approved construction. D is the upper plate of the fifth wheel, and $d$ is a head-block interposed between the spring B and the plate D. E are straps above the spring, and $e$ are clamping bolts which pass through holes in the said straps and in the plate D, and which clamp the head-block tightly between the said plate and spring.

A projecting arm F is formed on one side of the plate D and extends under the end portion of the reach. A king-bolt stay G is provided and has a plate $g$ at its upper end which overlaps the said arm F, and $g'$ are bolts which secure the said plate and arm to the said reach. The reach is secured by the bolts $g'$, and its front end is clear of the block $d$, being arranged at a little distance from it.

H is a stay secured to the upper side of the end portion of the reach and extending above the middle part of the leaf spring between the straps E.

I is the lower plate of the fifth wheel arranged under the plate D. The plates I and D are provided with any approved annular projections and grooves which engage with each other, and the lower plate I has lugs $i$ on its underside.

J is a portion of an axle of any approved construction, and $j$ is an axle block or bed interposed between the axle and the underside of the lower plate I and held in position laterally by the lugs $i$.

K is a strap plate under the axle, and $k$ are clamping bolts which pass through holes in the plates K and I and clamp the axle and its block securely in position. The lower end of the king-bolt stay G is provided with a boss $m$ under the strap plate K, and M is the king-bolt which passes vertically through holes in the stay H, the spring, the head-block, the upper and lower plates D and I, the axle-block, axle, strap plate, and the boss of the king-bolt stay.

The axle is free to oscillate to a limited extent in each direction, and the whole of the parts when thus constructed and arranged work very satisfactorily and are not liable to get out of order.

The axle J is permanently clamped to the lower plate I by the bolts $k$; and the leaf-spring B and the reach C are permanently secured to the upper plate D by the bolts $e$ and $g'$. The king-bolt M can be slid out so as to liberate the two plates D and I without disengaging them from the parts to which they are permanently clamped or secured. In this manner the axle and wheels can be disengaged from the wagon body.

The stay G can be sprung downward a little to permit the ribs or rings of the plates D and I to be freed from their grooves, but when flat plates are used it is not necessary to spring the stay G downward.

What I claim is:

In a fifth wheel, the combination, with a leaf spring, an upper circle-plate arranged with its center directly under the said leaf spring and provided with a projecting arm, a distance block arranged between the said spring and circle-plate, and clamping bolts securing the said parts together; of a lower circle-plate, an axle arranged directly under the center of the said lower circle plate, clamping bolts securing the said lower circle-plate and axle together, a reach resting on the said projecting arm with its front end clear of the said distance block, a top stay resting on the said spring and reach, a king-bolt stay arranged under the said reach, bolts securing the said stays and arm to the said reach, and a king-bolt passing through holes in the said stays, spring, block, circle-plates and axle and pivotally connecting the said circle-plates.

In testimony whereof I have affixed my signature in the presence of two witnesses.

JULIUS A. GRASBERGER.

Witnesses:
MORRIS S. CRIDLIN,
J. P. BEIRNE.